(12) United States Patent
Klinkert

(10) Patent No.: US 6,244,534 B1
(45) Date of Patent: Jun. 12, 2001

(54) AIRBORNE ELECTROMAGNETIC SYSTEM

(76) Inventor: Philip Samuel Klinkert, 2 Doveton Road, Parktown, Johannesburg 2001 (ZA)

( * ) Notice: Subject to any disclaimer, the term of this patent is extended or adjusted under 35 U.S.C. 154(b) by 0 days.

(21) Appl. No.: 09/212,377

(22) Filed: Dec. 16, 1998

(30) Foreign Application Priority Data

Dec. 19, 1997 (ZA) .................................................. 97/10175

(51) Int. Cl.$^7$ ....................................................... G01V 3/16
(52) U.S. Cl. ........................ 244/1 TD; 324/330; 324/331
(58) Field of Search .................... 244/1 TD; 324/330, 324/331

(56) References Cited

U.S. PATENT DOCUMENTS

| 2,955,251 | * | 10/1960 | Shaw et al. | 324/331 |
|---|---|---|---|---|
| 3,617,866 | | 11/1971 | Dowsett et al. | 324/330 |
| 3,836,841 | * | 9/1974 | Morrison | 324/330 |
| 3,872,375 | | 3/1975 | Ronka | 324/330 |
| 3,976,937 | * | 8/1976 | Hearn | 324/331 |
| 4,492,924 | | 1/1985 | Nilsson | 324/330 |
| 4,628,266 | | 12/1986 | Dzwinel | 324/330 |
| 5,610,523 | * | 3/1997 | Elliot | 324/330 |

FOREIGN PATENT DOCUMENTS

1638945 * 6/1992 (SU).

* cited by examiner

Primary Examiner—J. Woodrow Eldred
(74) Attorney, Agent, or Firm—Arent Fox Kintner Plotkin & Kahn, PLLC

(57) ABSTRACT

A towed aircraft for use in an airborne electromagnetic geophysical prospecting system which includes a transmitting antenna and power generating means for powering the antenna. A bird to which is mounted a receiving antenna may be towed by the towed aircraft.

21 Claims, 3 Drawing Sheets

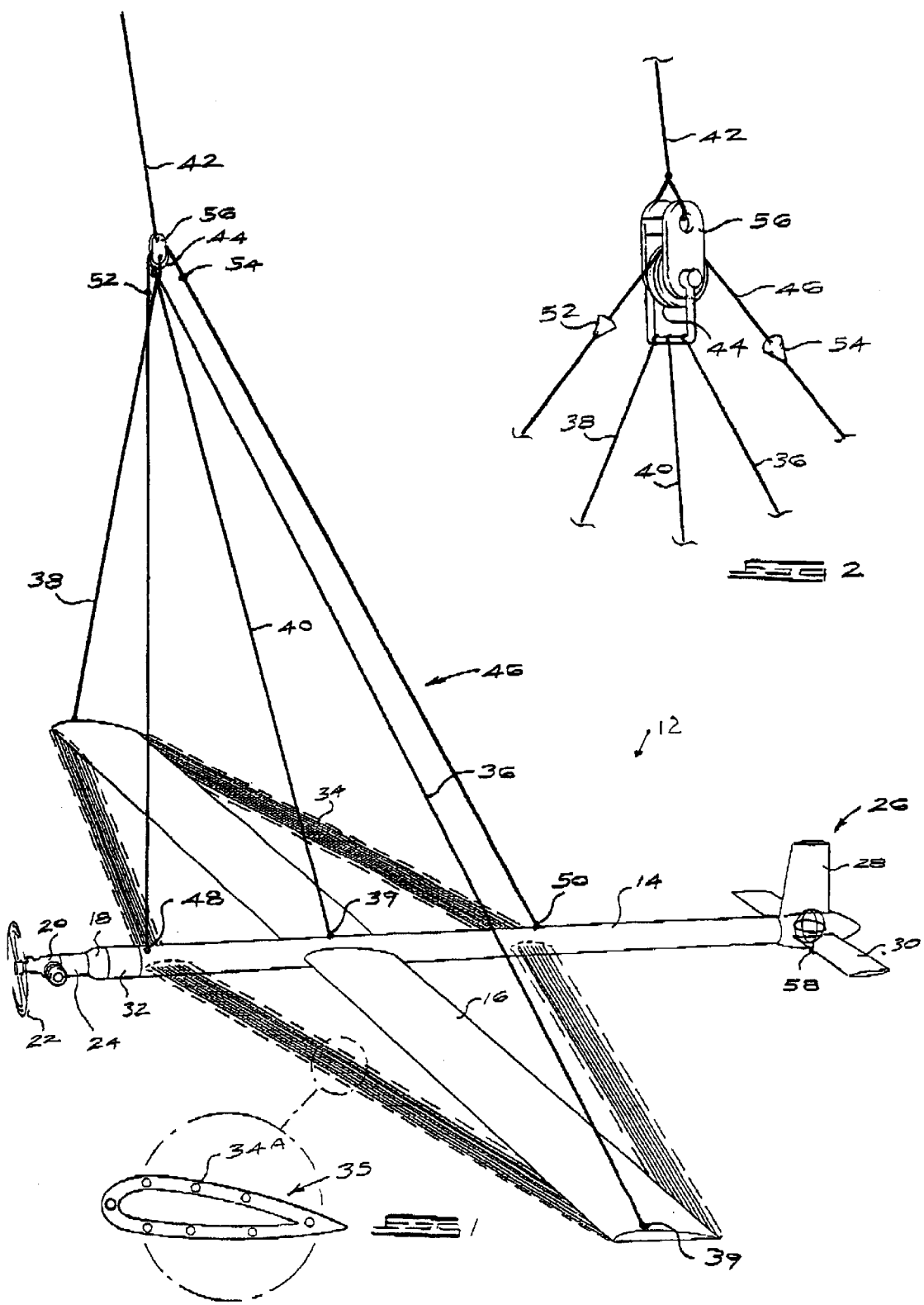

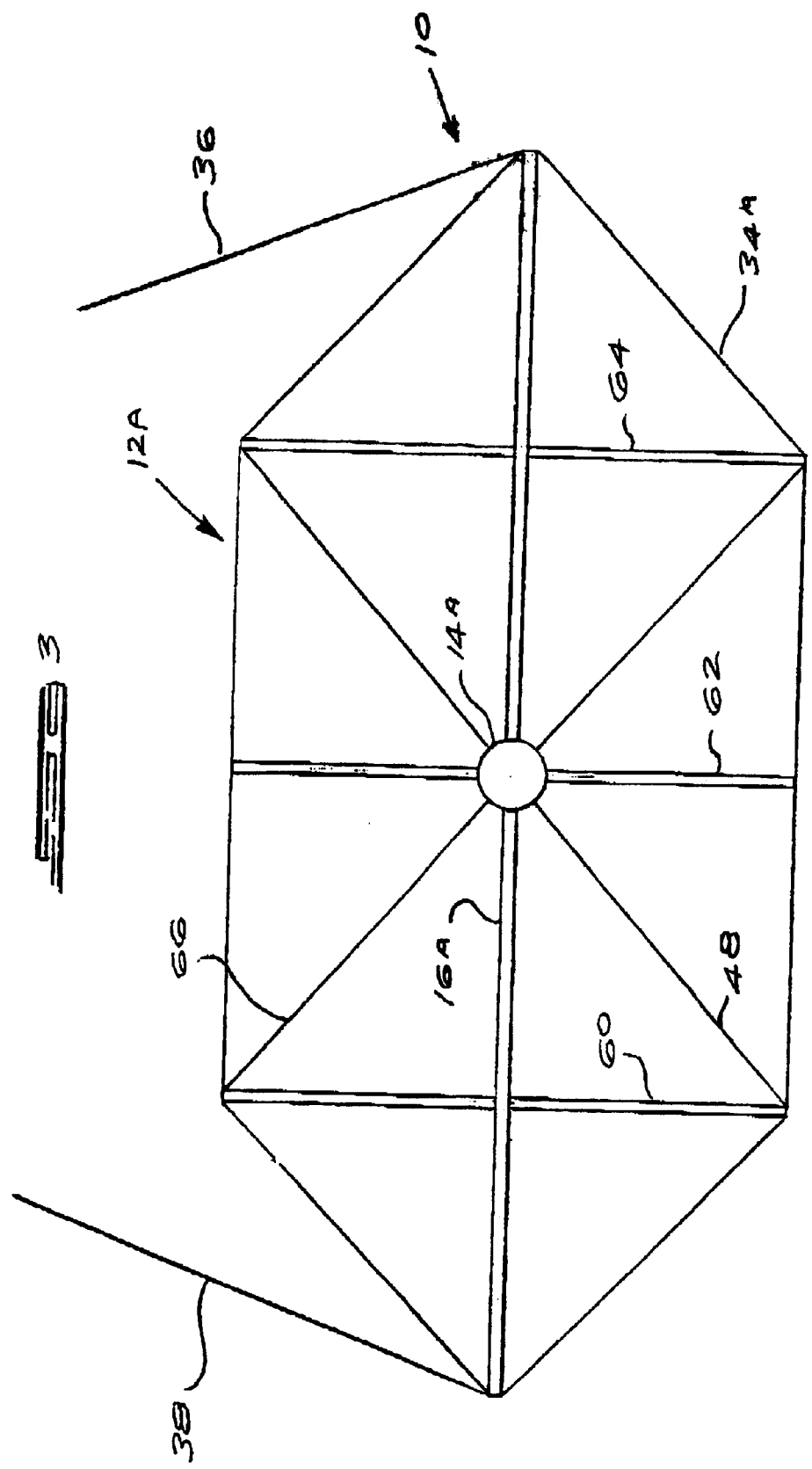

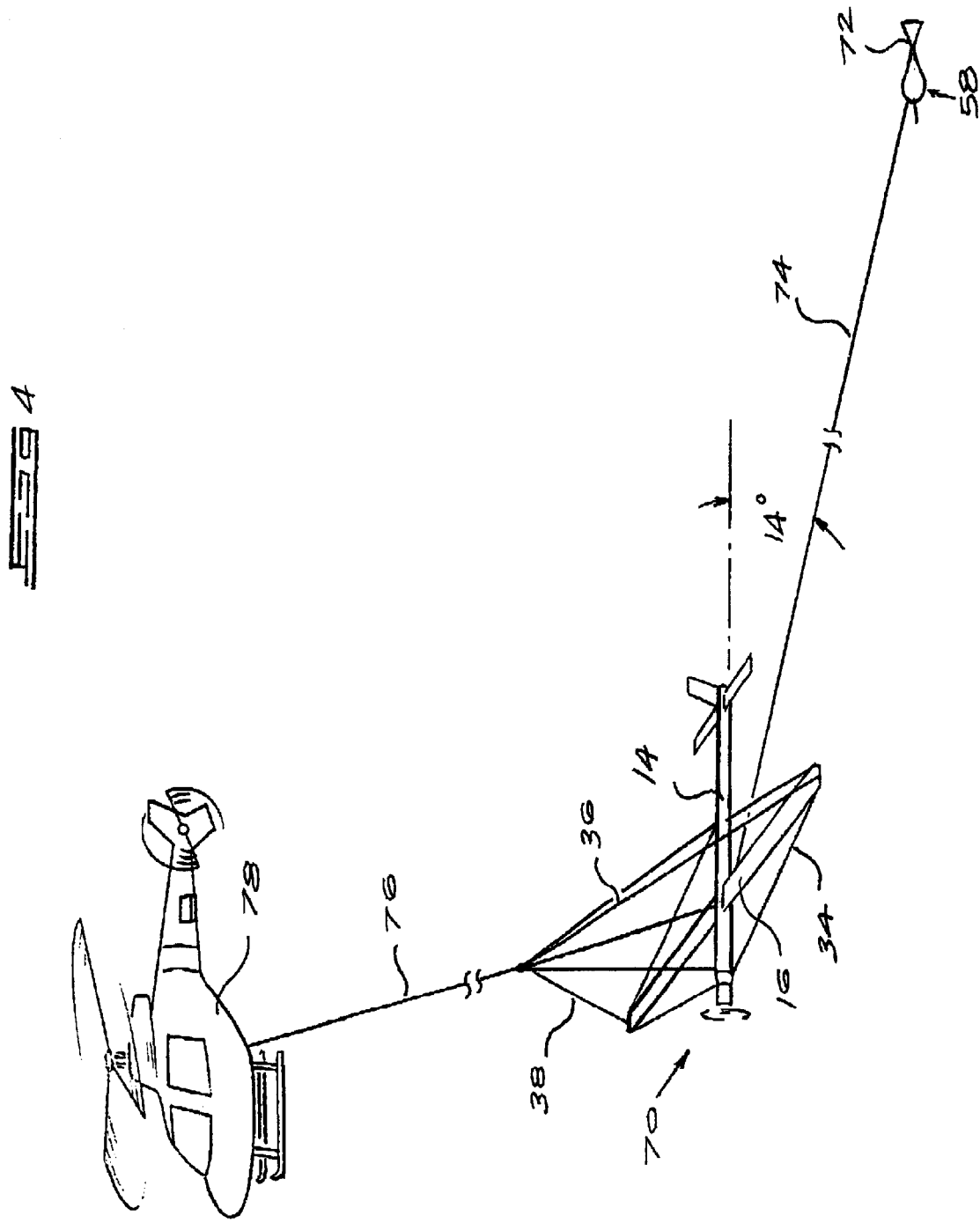

AIRBORNE ELECTROMAGNETIC SYSTEM

BACKGROUND OF THE INVENTION

This invention relates to an airborne electromagnetic system of a kind which is suitable for geophysical prospecting using electromagnetic fields.

In electromagnetic prospecting a primary alternating electromagnetic field is transmitted from one point and the resultant field, (i.e. the primary field plus the secondary field from the earth), is received at a second point, which is spaced from the first point. Anomalies in the earth, e.g. conductive substances, can be detected due to the secondary fields which are generated in them by the primary field and which are received at the second point.

In order to measure the secondary field accurately it is important that the primary field at the receiver should be as constant as possible. Generally, for large scale towed bird systems, the primary field is produced by a transmitting coil in an aircraft and the primary plus the secondary field from the earth is measured at the centre of a receiving coil or coils in a bird which is towed by the aircraft. In a system which is towed by a helicopter, the primary field at the receiver is kept as constant as possible by rigidly mounting the receiver and transmitter to a relatively short rigid boom.

It is apparent that aerodynamic stability of the bird is highly desirable. A large transmitting antenna or loop is also desirable and, where necessary, it should be possible to space the transmitting and receiving coils from each other by a significant distance.

SUMMARY OF THE INVENTION

The invention provides apparatus for use in an airborne electromagnetic geophysical prospecting system which includes an aircraft, a transmitting antenna on the aircraft, means on the aircraft for generating electrical power for operating the transmitting antenna, and means for attaching at least one tow rope to the aircraft for towing the aircraft.

The aircraft may be of any suitable kind and, for example, may include a fuselage, at least one wing or foil for generating lift, and a stabilising element.

The aircraft may be made, at least principally, for non-conductive and non-magnetic material such as timber, plastic or the like in order to minimise induced magnetic fields which are a source of noise.

The tow rope attachment means may be any suitable fixture e.g. eyelets, clamps or the like positioned at selected locations e.g. on the fuselage and wing.

The stabilising element may be any appropriate device and for example may include a rudder and a horizontal stabiliser or a drogue, or both these components. These items are given merely by way of example and are non-limiting.

The power generating means may include an engine which is fuel driven. Thus the aircraft may include a fuel tank.

The power generating means may, besides its primary purpose of producing electrical power, additionally be used to produce thrust and, for example, may drive at least one propeller or fan.

The invention also extends to an airborne electromagnetic geophysical prospecting system which includes a towing aircraft, and apparatus of the kind described attached to the towing aircraft by tow rope means.

The towing aircraft is, preferably, a helicopter.

The thrust which is produced by the power generating means may produce a significant proportion of the thrust which is required for self-sustaining flight of the aircraft. For example the power generating means may produce at least a quarter and preferably a third of the thrust which is required for self-sustaining flight of the aircraft.

The tow rope means may be attached to the foil or to the transmitting antenna at least at two spaced locations using any suitable fasteners. Two of the spaced locations are preferably situated at right angles symmetrically on either side of the aircraft fuselage and are preferably at or near respective ends of the foil. In order to minimise flexing of the foil and transmitting antenna during flight, an additional tow rope may be attached to a third point, e.g. at the centre of the foil or at the fuselage such that the three attachment points are essentially on a line which is at right angles to the fuselage. These three tow ropes may meet at a point approximately seven meters above the wing (in one particular example) and then from this point there is a single tow rope which goes up to the helicopter.

The system may include means for limiting the pitch of the aircraft relatively to the towing aircraft.

The pitch limiting means may include at least two pitch limiting ropes which are connected fore and aft to a fuselage of the aircraft at respective locations and which limit pitching of the aircraft upwards and downwards.

The pitch limiting ropes are connected to the aircraft at locations which are fore and aft respectively the aforementioned line on which the tow rope attachment points lie.

The pitch limiting ropes may extend upwardly from the fuselage of the aircraft towards a location at which the tow ropes, which are fixed to the aircraft, meet.

The pitch limiting ropes may be sections of a single rope which passes over a pulley positioned at the said location. The extent to which this rope can move about the pulley may be limited in any suitable way e.g. by placing or fitting stop fixtures to the rope. A convenient way of controlling or directing this movement is simply to knot the rope at two points which are positioned on opposing sides of the pulley.

However any other means or mechanism for controlling the pitch of the aircraft may be employed.

Thus, an alternative arrangement eliminates the pulley and uses two slack ropes attached at the point where the three tow ropes meet and to the fuselage and which become taut alternately as the aircraft pitches considerably upwards or downwards during liftoff or landing operations.

The system may include a receiving coil or antenna. For example a receiving coil may be mounted on the aircraft preferably at a location which is spaced by the maximum possible extent from the transmitting antenna. The receiving coil or antenna may be of any appropriate construction and for example may comprise a three-component device of a kind which is known in the art. The receiving coil may be hard mounted to the aircraft or it may have a suspension system between it and the aircraft.

The receiving antenna may be mounted on or be attached indirectly to the fuselage of the aircraft. For example the receiving antenna may be mounted on a receiver bird which, itself, is attached by means of a tow rope to the aircraft which, in turn, is towed by means of a helicopter.

Preferably the secondary craft i.e. the receiver bird, is attached to the aircraft at its centre of gravity, e.g. at the intersection of the wing or foil and the fuselage thereof.

The arrangement may be such that the secondary craft is towed at a substantially constant selected angle relatively to the aircraft. For example the secondary craft i.e. the receiver bird may be at an angle of approximately 14° below the horizontal plane in which the aircraft is positioned or flies. The preferred angle is determined by the airspeed, cable density and cable diameter and is the angle at which the cable flies essentially straight behind the aircraft when it is not attached to the receiver bird at the end.

The invention also extends to an airborne electromagnetic geophysical prospecting system which includes a towing aircraft, a towed aircraft which is attached to the towing aircraft by first tow rope means, a transmitting antenna on the towed aircraft, a receiver bird which is attached to the towed aircraft by second tow rope means, and a receiving antenna which is mounted to the receiver bird.

The system may include means for limiting upwards and downwards pitch of the towed aircraft relatively to the towing aircraft.

The system may also include power generating means on the towed aircraft for powering the transmitting antenna.

BRIEF DESCRIPTION OF THE DRAWINGS

The invention is further described by way of examples with reference to the accompanying drawings in which:

FIG. 1 illustrates part of a helicopter electromagnetic geophysical prospecting system, with a first antenna arrangement, with tow ropes and a pitch limiting pulley rope, according to the invention, FIG. 2 is an enlarged view of a pulley which is used in the system of FIG. 1, FIG. 3 is a front view of an electromagnetic prospecting system according to a second form of the invention which includes an antenna arrangement which is different from that shown in FIG. 1, and FIG. 4 illustrates a third form of the invention in which a receiving antenna is displaced by a significant extent from a transmitting antenna.

DESCRIPTION OF PREFERRED EMBODIMENTS

FIG. 1 of the accompanying drawings illustrates apparatus 10, according to the invention, for use in an airborne electromagnetic geophysical prospecting system.

The apparatus 10 includes an aircraft 12 which, in turn, includes a fuselage 14, a wing or foil 16, a fuel tank 18, a motor 20 which drives a propeller 22 and an electrical power generator 24, and a stabiliser 26 at a tail end of the fuselage.

The fuselage 14 should be rigid and, to this end, may be made in any suitable way. Thus, for example, the fuselage could be tubular or truss-like.

The fuel tank 18, motor 20, propeller 22 and power generator 24 may be replaced by a battery as an alternate electrical power source for the transmitter. In this case no thrust is produced for the aircraft.

The stabiliser 26 includes a rudder 28 and a horizontal fixed wing or stabiliser 30. The stabiliser may alternatively be in the form of a V tail or have an annular construction, for example as in a conventional helicopter electromagnetic system (HEM system).

The components 28 and 30 are given merely by way of example and may be replaced by or used in combination with any appropriate device e.g. a stable drogue, not shown.

The motor 20 may have a rating of the order of 17 kilowatts. The motor is of a conventional construction and draws fuel from the tank 18. The motor drives the propeller 22 and is also used to drive the generator 24. Merely by way of example the generator may be rated at 24 volts and 400 amperes.

If the motor has an electrical ignition system it is necessary to shield the ignition system magnetically and electrically so that it does not interfere electromagnetically with the HEM system.

A transmitter 32 is mounted in the fuselage adjacent the generator. The transmitter is also of a known construction and consequently is not described in detail herein. The transmitter is powered directly from the generator 24. The transmitter is connected to a multi turn transmitter loop 34 which extends around opposed extremities of the wing 16 and contact points on the fuselage 14. In plan the transmitter loop is square and, for example, may be approximately 4 meters by 4 meters.

The loop may be formed in any appropriate way and may be formed from aluminium bars, tubes or wires which may be separated by small distances from each other. The bars, tubes or wires can be placed in any geometrical relationship to each other and can be exposed to the airflow but preferably are enclosed in a streamlined housing in order to reduce vibration of the loop conductors during flight. The inset drawing of FIG. 1 shows in cross-section aluminium bar components 34A, which make up the loop 34, enclosed in a streamlined aerofoil section 35, of any suitable material. The bars are held rigidly spaced from each other in a way which eliminates relative movement between the bars due to high frequency small amplitude vibrations during flight.

In a preferred embodiment, a number of rectangular aluminium bars or tubes enclosed in a streamlined aerofoil housing are used rather than a single self supporting tube or aerofoil section.

The aerofoil section may be streamlined to reduce drag, but may also be designed to generate lift, in addition to the lift which is produced by the wing. The section 35 may in fact replaced the wing 16, even though the section has a four-sided shape in plan.

Opposed ends of the wing 16 provide attachment points to which tow ropes 36 and 38 respectively are attached using eyelets, clamps or similar devices 39. A third tow rope 40 is attached to the centre of the wing. The three tow ropes meet at a point approximately seven meters above the wing and from here there is a single tow rope 42 up to the helicopter.

At the point where the three tow ropes meet there is a pulley 44 over which passes a pitch limiting pulley rope 46 which is in turn attached at its front end to a point 48 near the front of the fuselage and at its rear end to a point 50 near the centre of the fuselage. Near the pulley there are two knots 52 and 54 respectively in the rope. The tow rope 42 is fixed to a pulley housing 56.

The purpose of this hardware is to limit the pitch angles that the aircraft can attain during liftoff or landing operations. Under these conditions, the aircraft forward speed is zero and the helicopter rotor downwash acts on the large area of the stabiliser forcing it downwards. It there were no means to limit this downward movement during liftoff and landing, the aircraft would pitch to a vertical position which would result in difficult liftoffs and landings. The front knot 52 on the rope is placed in a position so as to limit the upward pitch of the aircraft to about 25° and the rear knot 54 is positioned on the rope in a position which limits the downward pitch of the aircraft to about 10°. The two positions where the rope attaches to the aircraft are important since the objective is to keep the pulley rope taut as the three tow ropes and pulley move backwards and forwards with changes in helicopter airspeed during normal surveying conditions.

From FIG. 2 it can be seen that the two ropes and pulley 44 trace out a fore-aft circular path as the helicopter speed increases since the aircraft drag varies with airspeed and hence the angle of the tow rope from the aircraft to the helicopter varies. The pulley also attempts to trace out a fore-aft elliptical path with changes in helicopter airspeed due to it being constrained by the pitch limiting pulley rope. The objective is therefore to make the circular and elliptical paths coincide as closely as possible for the selected range of backward and forward aircraft pitch angles during liftoff and landing.

The optimum locations for attaching the pitch limiting pulley rope to the aircraft can readily be determined by iterative mathematical techniques. Note in addition that the taut pulley rope also provides additional support for the aircraft fuselage thereby reducing its bending moment considerably at the point where the central tow rope 40 attaches to the fuselage.

An alternative arrangement for the pitch limiting pulley rope which does not provide additional fuselage support is to dispense with the pulley and then attach one slightly slack rope from the front of the fuselage to the point where the three tow ropes meet and another somewhat slacker rope from this same point to a point about halfway along the fuselage. The lengths of these slack ropes are calculated so that the front rope becomes taut when the aircraft pitches 10° downwards and the rear rope becomes taut when the aircraft pitches 25° upwards.

The fuselage 14 is tubular or truss-like and of suitable dimensions. It can also have struts and wires to rigidify the fuselage in the longitudinal direction and to reduce aircraft weight. Merely by way of example the spacing between the intersection of the wing and the fuselage, and the stabiliser 26, is of the order of 12 meters.

A receiving antenna 58 is mounted to the aircraft at the stabiliser 26 or it can be mounted at this location on a suspension system. The receiver includes three component receiving coils of a kind known in the art which are oriented at 90° relatively to one another.

The aircraft 12 is similar to a conventional aircraft but it is to be noted that the thrust which is provided by the propeller 22 is not sufficient to provide self-sustaining flight. For example the propeller may provide only one quarter to one-third of the thrust produced by a conventional aircraft, and required for self-sustaining flight.

The wing 16 is designed to generate lift when the aircraft is towed.

In FIG. 1 the plane of the transmitting loop 34 is horizontal. FIG. 3 on the other hand illustrates an alternative arrangement wherein the plane of the transmitting loop 34A is vertical.

FIG. 3 is a front view of an aircraft 12A which includes a tubular or truss-like fuselage 14A and a wing or foil 16A. The wing has three struts 60, 62 and 64 attached to it at spaced intervals and extending vertically. The transmitter loop 34A extends around extremities of the struts and opposed ends of the wing 16A. The struts are braced by means of cables 66.

The apparatus 10 is, in use, attached to a helicopter, not shown, by means of the tow ropes 36, 38 and 40 which meet at a point approximately seven meters above the aircraft and from this point a thirty meter long tow rope 42 extends up to the helicopter. The helicopter draws the aircraft 12 through the air. A primary electromagnetic field is produced by the transmitter and transmitting loop 34 and the primary field plus the secondary field from the earth is detected by the three component receiving coils 58. These aspects are conventional and consequently are not described further herein.

The aircraft 12 is more stable aerodynamically then a conventional helicopter electromagnetic (HEM) bird under conditions of zero pitch, roll and yaw, since the forces of weight, thrust, lift, drag, that of the stabilizing element and that of the tow ropes, act essentially through one point which is the centre of gravity of the aircraft. Under conditions where pitch, roll and yaw are not zero, an analysis of the forces shows that there are strong righting moments caused by the laterally spaced in line tow ropes, the stabiliser and/or drogue and the motor which always act to keep the aircraft aligned in the flight direction. In a conventional helicopter bird, the tow rope consists of a fixed triangular fore-aft bridle and an analysis here of the forces shows that the bird pitches upwards at low airspeeds and downwards at high airspeeds, which is undesirable geophysically and aerodynamically.

The transmitting loop area is large and consequently a large dipole moment (DM) can be generated. The dipole moment is given by the following expression: DM=N.I.A where N=the number of turns in the transmitter loop, I is the current and A is the loop area. The motor 20 provides a significant amount of current, for the example given of the order of up to 400 amps RMS, for the loop. This, together with the large loop area and the number of turns, means that a large RMS dipole moment can be generated. The large RMS current means that the transmitter is very well suited for generating an essentially square wave current through the loop. A square waveform contains a large amount of low frequency energy which in turn allows deep penetration in conductive environments. To the applicant's knowledge conventional HEM systems can only draw a relatively small amount of power from a generator on the helicopter, which together with small transmitter loop areas, results in small dipole moments.

The wing 16 provides additional lift so that the helicopter has to do less work to tow the aircraft 12 through the air and therefore survey flying time can be considerably extended. The lift provided by the wing at a helicopter flying speed of 70 knots is currently about one-third of that required for self sustaining flight of the aircraft. As has been pointed out the lift required for the aircraft can also be generated at least partly by the section 35, which carries the antenna components, and which can be used together with the wing 16, or in place thereof.

The motor with the propeller 22 provides additional thrust and aerodynamic stability. This means that the helicopter has less work to do and secondly that less noise from aerodynamic instability is present in the detected secondary signal.

As the wing 16 generates lift the helicopter survey flying time can be considerably extended. In effect the helicopter tows a motorised glider rather than a dead weight which also has drag. It is considerably easier for the helicopter to tow the "thrust and lift" producing "motorised glider", which is constituted by the aircraft 12, than to tow a conventional HEM bird.

It is to be noted that the receiver coil 58 is close to the transmitter coil 34. Thus the primary field generated by the transmitter coil is extremely large compared to the secondary field which is received from the ground and which is the signal of importance. Because the aircraft 12 and the transmitter loop 34 cannot be made perfectly rigid, difficulty may be encountered in removing the primary field totally so that only the secondary field is left for processing. The arrangement shown in FIG. 4 is intended to counter this difficulty.

FIG. 4 illustrates an aircraft 70 which is substantially the same as the aircraft 12 shown in FIG. 1. However the aircraft 70 does not include a receiver coil 58 mounted to it. The receiver coil is instead attached to a high drag bird 72 which is connected by means of a cable 74 to the aircraft 70. The length of the cable 74 may vary from 20 to 60 meters. The design is such that the cable extends downwardly, at approximately 14° from the horizontal, from the aircraft 70 to the bird 72. The cable is attached to the centre of gravity of the aircraft 70 i.e. at the intersection of the wing 16 and the fuselage 14.

A tow rope 76, which may be of the order of 40 meters long, it attached to the tow ropes 36 and 38 and to a towing helicopter 78.

The system shown in FIG. 4 possesses the following advantages:

1. Due to the mechanical and aerodynamic properties of the cable 74 together with the particular geometry of the design, the cable 74 remains essentially straight under normal survey conditions and hence the separation between the transmitting coil 34 and the receiving coil 58, which is carried by the bird 72, remains substantially constant. Thus there is one less variable to take into account when removing the primary field from the signal detected by the coil 58.

2. As the primary field is large compared to the secondary field from the ground when the transmitter coil and receiver coil are closest to one another and as the primary field should ideally be totally removed so that only the secondary field from the ground is left for analysis, it is highly advantageous to make the primary field as small as possible relatively to the secondary field. This is achieved by separating the transmitter and receiver coils by the largest practicable distance. This objective is, in turn, achieved by using a stable high drag receiver bird 72 towed from the centre of gravity of the transmitter aircraft 70 by means of the cable 74 which is held substantially straight at an angle of approximately 14° below the horizontal.

Under typical surveying conditions e.g. in mountainous terrain the airspeed can vary from 40 to 80 knots. In order to keep the angle between the transmitter aircraft 70 and the stable high drag receiver bird 72 at an angle as close as possible to preferred angle of 14° the receiver bird is preferably constructed in such a way that the combination of its drag and lift varies with the airspeed in such a way as to keep this angle essentially constant.

The system shown in FIG. 4 combines the advantages of the large coil separation in a fixed wing towed bird electromagnetic prospecting system and the low flying height of a conventional helicopter system. The large coil separation provides increased sensitivity for detecting deeply buried conductors while the lower flying height gives considerably better depth of penetration.

The systems shown in FIGS. 1 and 4 are also aerodynamically stable. The tendency of the receiver coils to pendulum fore and aft or sideways relatively to the transmitter coil, as is the case with conventional fixed wing towed bird airborne electromagnetic systems having low drag birds, is reduced.

As indicated most of the structure of the aircraft 12 is preferably made from non-conductive and non-magnetic material so that noise which arises from electrical and magnetic effects can be reduced.

Another point is that due to the much smaller size of the transmitter loop compared to that of a conventional fixed wing towed bird system, the transmitter loop can be made far more rigid than the loop in a conventional fixed wing airborne electromagnetic system. This results in lower noise levels especially under turbulent conditions. It is to be noted that the use of a two, or preferably three, point spaced bridle towing system whose attachment points are in a line at right angles to the aircraft fuselage or direction of flight carries with it the benefit that the fuselage is aligned in the direction of flight even if the airspeed varies. This is not the case with a conventional two point fore-aft HEM bridle towing system.

The pitch limiting rope system which has been described hereinbefore and which is used in conjunction with the lateral or transverse two or three point spaced bridle towing system limits the pitch of the aircraft during lift-off and landing and imparts stability to the transverse bridle system.

What is claimed is:

1. Apparatus for use in an airborne electromagnetic geophysical prospecting system which includes an aircraft, the aircraft including a transmitting antenna, means for generating electric power for operating the transmitting antenna, and thrust producing means which is driven by the power generating means, and means for attaching at least one tow rope to the aircraft for towing the aircraft.

2. Apparatus according to claim 1 wherein the transmitting antenna includes a plurality of antenna components which are mounted in a streamlined aerofoil section.

3. Apparatus according to claim 2 wherein the aerofoil section is shaped to generate lift.

4. Apparatus according to claim 2 wherein the aircraft includes a wing for generating lift.

5. An airborne electromagnetic geophysical prospecting system which includes a towing aircraft, and apparatus according to claim 1 attached to the towing aircraft using tow rope means.

6. A system according to claim 5 wherein the towing aircraft is a helicopter.

7. A system according to claim 5 wherein the tow rope means is attached to the aircraft at least at two spaced locations.

8. A system according to claim 7 wherein the said spaced locations lie on a line which is substantially at right angles to a fuselage of the aircraft.

9. A system according to claim 5 which includes means for limiting the pitch of the aircraft relatively to the towing aircraft.

10. A system according to claim 9 wherein the pitch limiting means includes at least two pitch limiting ropes which are connected fore and aft to a fuselage of the aircraft at respective spaced locations and which limit pitching of the aircraft upwards and downwards.

11. A system according to claim 5 which includes a receiving antenna which is mounted to the aircraft.

12. An airborne electromagnetic geophysical prospecting system which includes a towing aircraft, an aircraft, a transmitting antenna on the aircraft, and means on the aircraft for generating electric power for operating the transmitting antenna,
   wherein the aircraft is attached to the towing aircraft using tow rope means, and
   wherein the system includes a receiver bird which is attached by means of a tow rope to the aircraft, and receiving antenna which is mounted to the receiver bird.

13. A system according to claim 12 wherein the receiver bird is attached to the aircraft at its centre of gravity.

14. A system according to claim 12 wherein the receiver bird is arranged to be towed at a substantially constant selected angle below a horizontal plane in which the aircraft flies.

15. An airborne electromagnetic geophysical prospecting system which includes a towing aircraft, a towed aircraft which it attached to the towing aircraft by first tow rope means, a transmitting antenna on the towed aircraft, a receiver bird which is attached to the towed aircraft by second tow rope means, and a receiving antenna which is mounted to the receiver bird.

16. A system according to claim 15 which includes means for limiting upwards and downwards pitch of the towed aircraft relatively to the towing aircraft.

17. A system according to claim 15 which includes power generating means on the towed aircraft for powering the transmitting antenna.

18. A system according to claim 15 wherein the towed aircraft includes a wing for generating lift.

19. A system according to claim 15 wherein the first tow rope means is attached to the towed aircraft at spaced points which lie in a line which is at right angles to the direction of flight of the towed aircraft.

20. A towed aircraft for use in an airborne electromagnetic geophysical prospecting system which includes a transmitting antenna, power generating means for powering the transmitting antenna, and thrust producing means which is driven by the power generating means.

21. An aircraft according to claim 20 wherein the transmitting antenna includes a plurality of antenna components mounted in a streamlined aerofoil section which is shaped to generate lift.

\* \* \* \* \*